United States Patent [19]

Matsueda

[11] Patent Number: 5,479,403
[45] Date of Patent: Dec. 26, 1995

[54] COMMUNICATION APPARATUS

[75] Inventor: Kazutaka Matsueda, Yokohama, Japan

[73] Assignee: Canon Kabushiki Kaisha, Tokyo, Japan

[21] Appl. No.: 243,115

[22] Filed: May 16, 1994

[30]  Foreign Application Priority Data

May 28, 1993 [JP] Japan .................. 5-151224

[51] Int. Cl.⁶ ......................................... H04N 1/32
[52] U.S. Cl. .................. 370/80; 358/404; 370/110.1
[58] Field of Search ............... 455/58.1; 379/96, 379/100; 358/400, 404, 405, 437, 468; 340/825.5, 79, 80, 83, 84, 110.1

[56]  References Cited

U.S. PATENT DOCUMENTS

| | | | |
|---|---|---|---|
| 3,811,013 | 5/1974 | Costa et al. ................. | 370/80 |
| 4,082,922 | 4/1978 | Chu ............................ | 370/80 |
| 4,351,049 | 9/1982 | Nobis ......................... | 370/80 |
| 4,542,497 | 9/1985 | Huang et al. ............... | 370/80 |
| 4,638,476 | 1/1987 | Acampora et al. ......... | 370/83 |
| 4,862,282 | 8/1989 | Nakajima ................... | 358/400 |
| 4,876,604 | 10/1989 | Nobuta ...................... | 358/400 |
| 4,905,302 | 2/1990 | Childress ................... | 455/58.1 |
| 4,974,097 | 11/1990 | Kaneko et al. ............. | 358/400 |
| 4,995,073 | 2/1991 | Okata et al. ................ | 379/94 |
| 5,041,915 | 8/1991 | Hirota et al. ............... | 358/400 |
| 5,050,005 | 9/1991 | Kagami ...................... | 358/434 |
| 5,073,827 | 12/1991 | Nakajima ................... | 358/437 |
| 5,142,568 | 8/1992 | Ogata et al. ................ | 379/100 |
| 5,204,895 | 5/1993 | Yoshiura .................... | 379/100 |
| 5,291,302 | 3/1994 | Gordon et al. ............. | 358/404 |
| 5,323,398 | 6/1994 | Wake et al. ................ | 370/112 |

*Primary Examiner*—Benedict V. Safourek
*Attorney, Agent, or Firm*—Fitzpatrick, Cella, Harper & Scinto

[57]  ABSTRACT

A data communication apparatus includes a transmitter that is operable in either a memory transmission mode, wherein data converted by a data converter is transmitted to a destination, or in another transmission mode in which data other than the converted data is transmitted to a destination. The apparatus discriminates whether the data converter is available to convert data or not, and operates the transmitter in the memory transmission mode when the data converter is available.

7 Claims, 11 Drawing Sheets

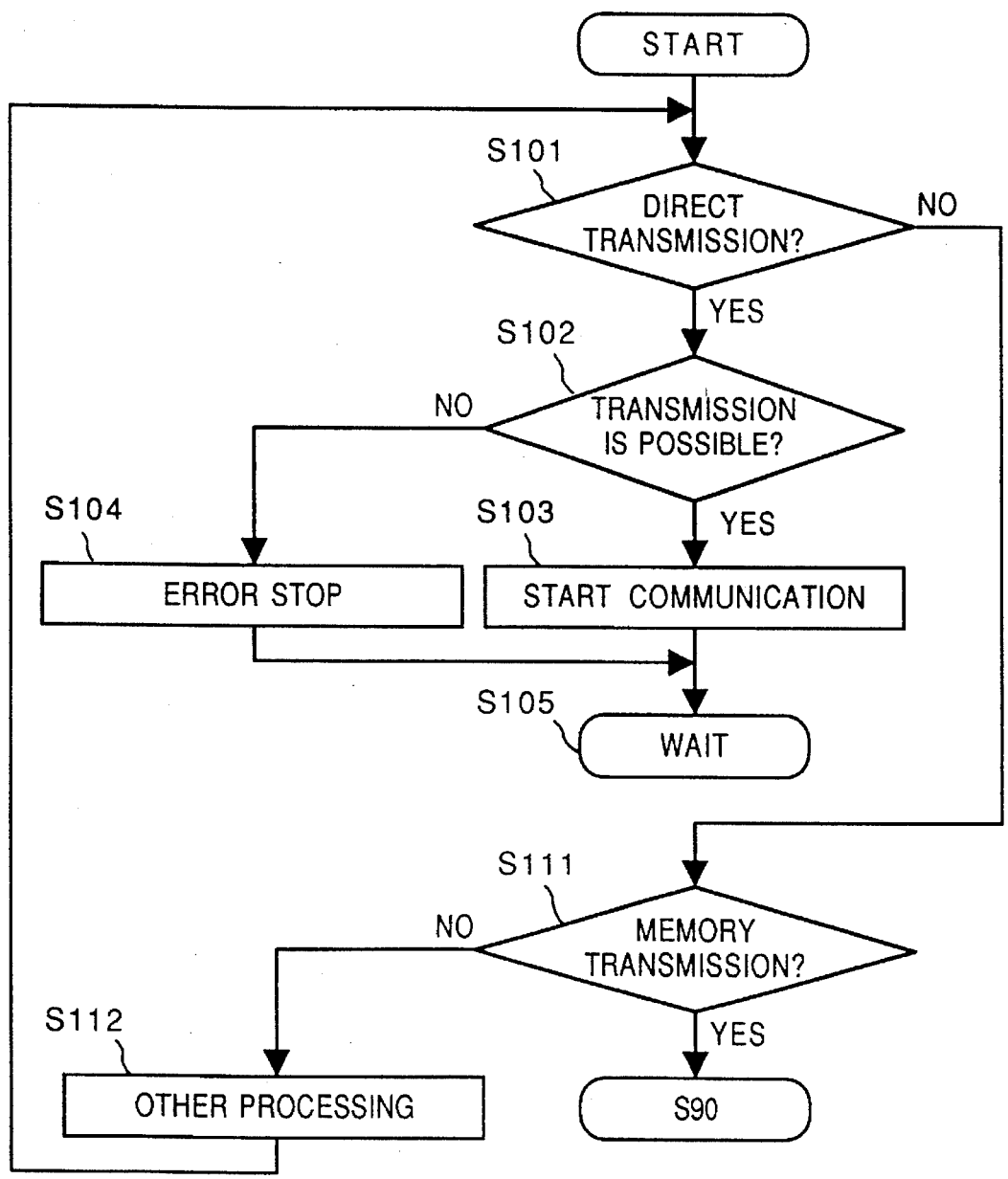

COMMUNICATION APPARATUS

BACKGROUND OF THE INVENTION

1. Field of the Invention

The present invention relates to a communication apparatus capable of concurrently executing multiple communications through a plurality of channels.

2. Description of the Related Art

A group 4 facsimile connected to an ISDN, for example, is known as a facsimile apparatus having a plurality of channels.

In such a G4 facsimile, the multichannels of ISDN may be used to place a phone call from a telephone set belonging to the apparatus, while in its state of Group 4 facsimile transmitting to one destination to a different destination, or, during a transmission, to receive from a facsimile which is not involved in such transmission. It is also possible to perform a concurrent operation in which, during a transmission, another transmitting operation to a different destination is effected.

In general, there are two types of image transmitting methods in a conventional facsimile, i.e., memory transmission and direct transmission.

In the memory transmission method, data of the document to be transmitted is previously stored into a data accumulating memory and, after initiating the communication, the accumulated data is converted by a data conversion section correspondingly to the resolution and paper size of the receiver and the converted data is transmitted to the called facsimile apparatus.

In the direct transmission method, on the other hand, the facsimile at a destination is called before reading the document and, after ascertaining the possible paper size and resolution which may be received at the receiver, the reading operation is started to transmit the data to the receiver.

FIGS. 2A and 2B are flowcharts schematically showing each communication operation according to the above conventional two methods. FIG. 2A shows the flow of the image data in memory transmission while FIG. 2B shows flow of the image data in direct transmission.

Referring to FIG. 2A, data from a data accumulating memory is converted through a data conversion section. After being accumulated again into a data accumulating memory, the data is delivered to a data communication section so that the data is transmitted onto a line.

Since, in FIG. 2B, the resolution and document size are known when reading the document at a data input section such as a scanner, data is delivered to the data accumulating memory from the data input section and the data is then delivered to the data communication section to be transmitted onto a line.

In other words, while, in the direct transmission, the data input section such as a scanner is occupied during a transmission, what is occupied in the memory transmission is the data conversion section.

In a facsimile having a plurality of communication channels, a data conversion section corresponding to two separate transmitting operations is necessary if, during a memory transmission through one of the channels, a memory transmission through another channel is to be enabled. This results in higher cost.

SUMMARY OF THE INVENTION

It is an object of the present invention to simplify construction of a communication apparatus without sacrificing its usefulness.

It is another object of the present invention to provide a communication apparatus in which, when a memory communication is being performed through one of the channels, memory communication through the other channel is limited.

It is a further object of the present invention to provide a communication apparatus comprising:

transmission means for performing transmission through a plurality of channels;

memory means for storing a plurality of transmitting data; and management means for managing order of transmission of said plurality of transmitting data such that the plurality of transmitting data are sequentially transmitted by the transmission means; wherein:

said management means managing the order of transmission upon a request for memory transmission such that the requested memory transmission is executed after completion of another memory transmission which is currently being executed; and upon a request for direct transmission, the transmission means executing the requested direct transmission independently of the order of transmission managed by the management means.

It is still another object of the present invention to efficiently use a circuit which is for use in converting transmitting data stored in a memory in accordance with the destination of the transmission.

These and other objects of the present invention will be apparent from the following description of some embodiments of the present invention.

BRIEF DESCRIPTION OF THE DRAWING

FIG. 10 is a flowchart showing operation in the case where a direct transmission is requested in the above embodiment.

DESCRIPTION OF THE PREFERRED EMBODIMENTS

Figure 1:
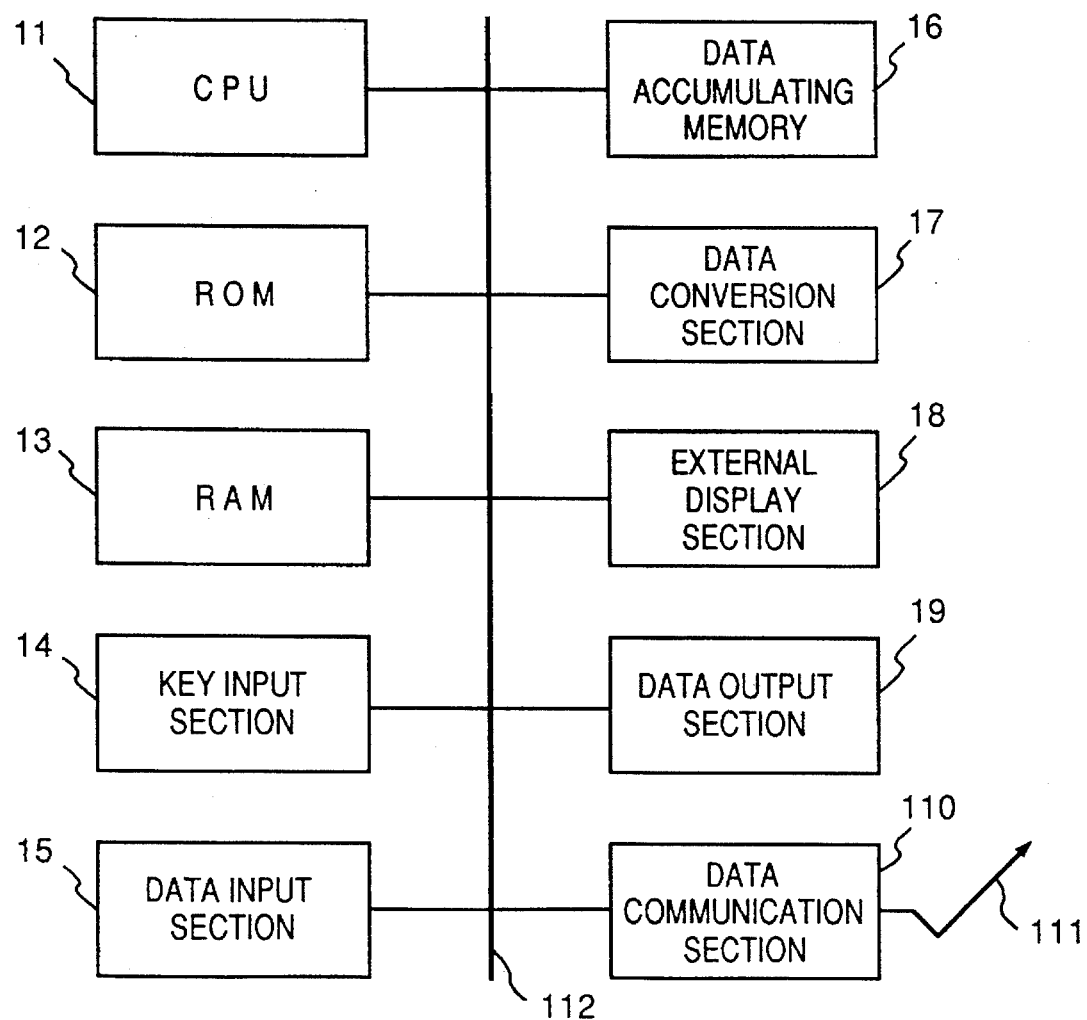
FIG. 1 is a block diagram showing an embodiment of the present invention.
Figure 2A:
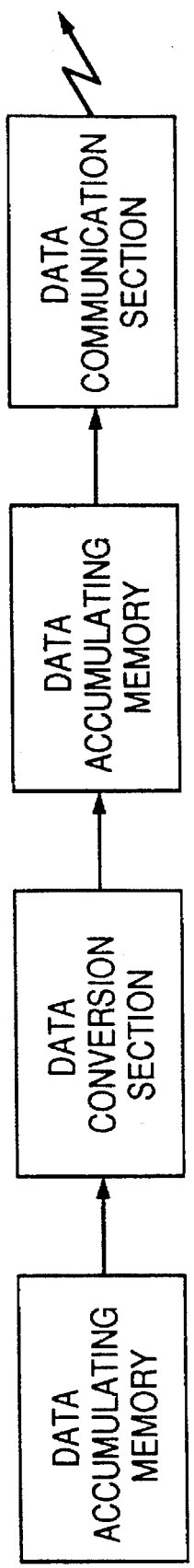
FIGS. 2A and 2B are flowcharts schematically showing communication operation of two conventional methods.
Figure 2B:
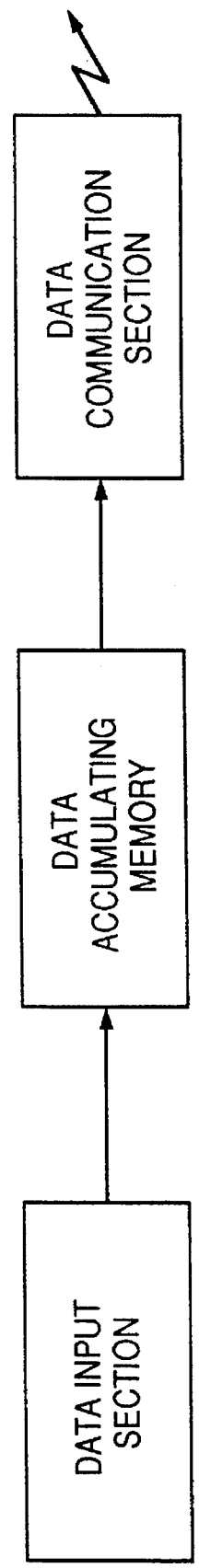

FIG. 1 is a block diagram showing the construction of a facsimile apparatus according to an embodiment of the present invention.

This facsimile apparatus includes: a CPU 11 for administering control of the apparatus as a whole in accordance with a program stored in a ROM 12; a RAM 13 for temporarily storing data to be used at the CPU 11; a key input section 14 through which an operator effects various key inputs; a data input section 15 for reading an image on a document surface and for converting it into a digital signal; a data accumulating memory section 16 such as a hard disk for accumulating received image data and read image data; a data converting section 17 for converting the image data accumulated in the data accumulating memory section 16 into a data format suitable for communicating with the called party when it is to be delivered onto a data line 111 and, otherwise, for converting the received data into a data format suitable for internal processing; an external display section 18 such as an LCD for providing a display to the user by means of characters and figures; a data output section 19 for providing a permanently visible display of a received image or a report or the like; a data communication section 110 for performing data communication with another communication device through the line 111; and a system bus 112.

Figure 3:
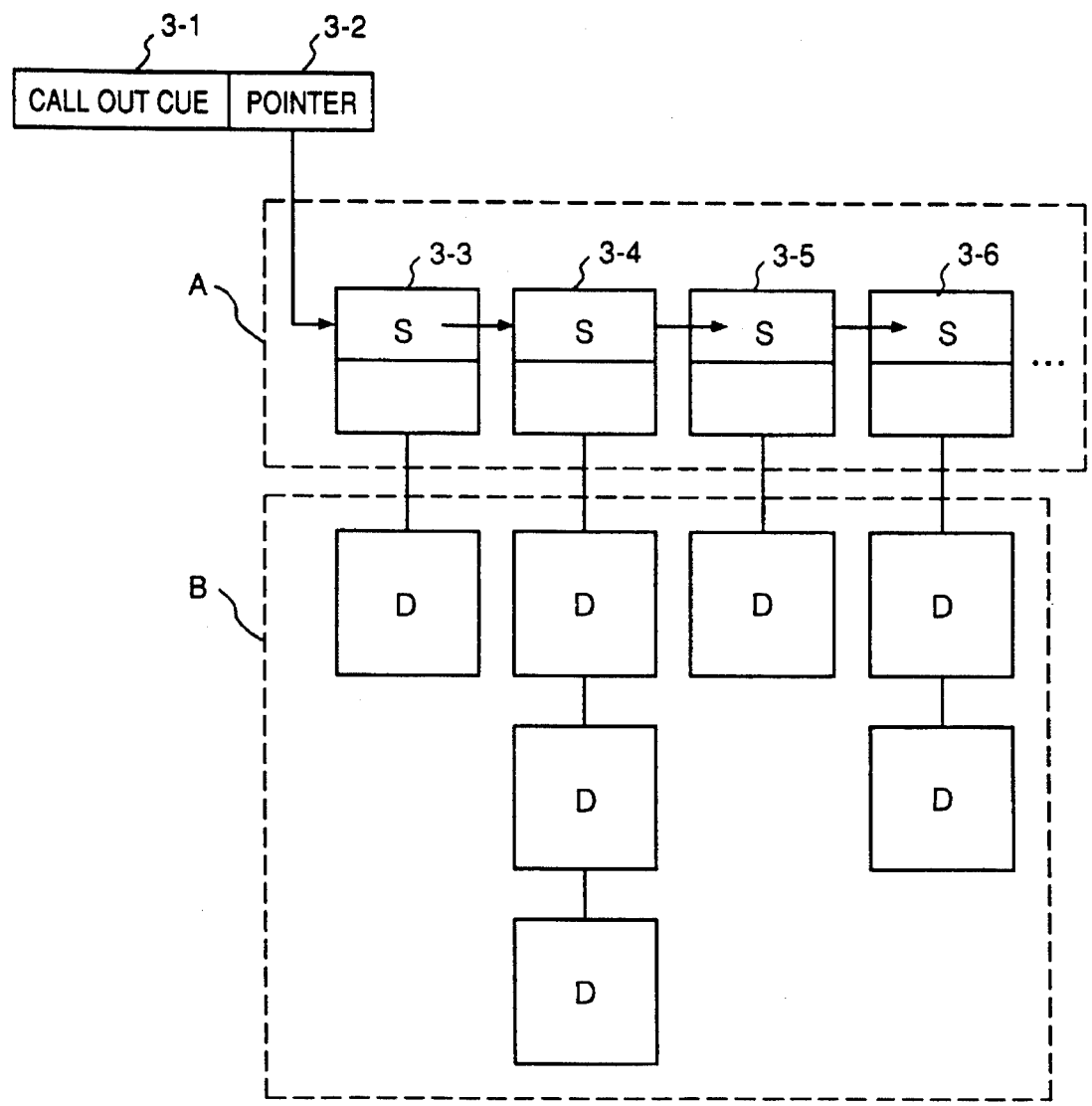
FIG. 3 illustrates a call out queue for storing services according to a servicing order by which their call outs are requested by the user.

FIG. 3 illustrates a call out cue (queuing) for storing services in the servicing order requested for call out by the user.

This call out cue is provided in the RAM 13. A description will now be given by way of FIG. 3 with respect to control of the order of transmission according to the present embodiment.

Referring to FIG. 3, denoted by 3-1 is an ID section for indicating the call out cue. The ID section 3-1 is a cue for managing the transmitting service directed by the user or the relevant service when time is up in a time designated transmission. Further, denoted by 3-2 is a pointer section for storing the service whose call out is requested first.

Furthermore, denoted by 3-3~3-6 are services which have been requested for call out and are managed in the call out cue, 3-3 of these being the service requested first.

Figure 4A:
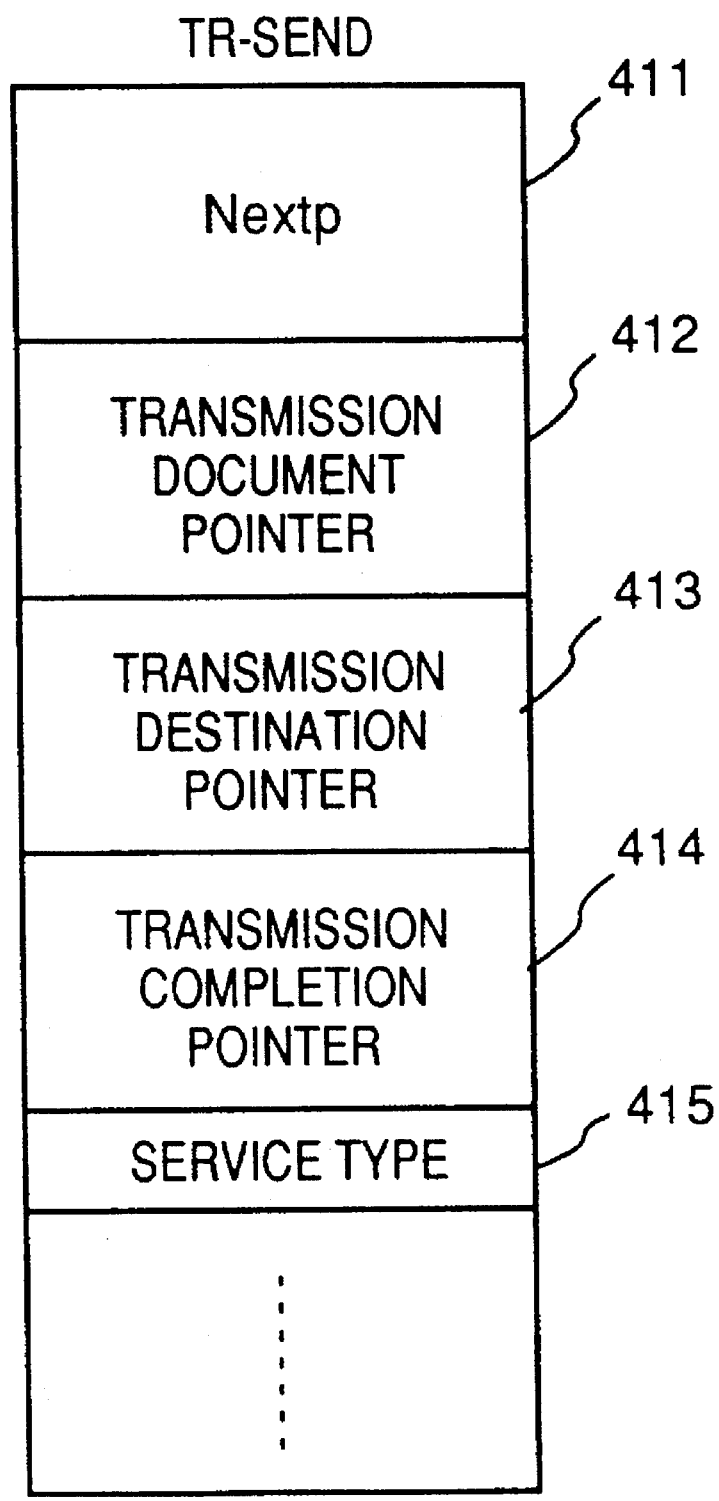
FIGS. 4A and 4B illustrate service and destination transactions in the above embodiment.
Figure 4B:
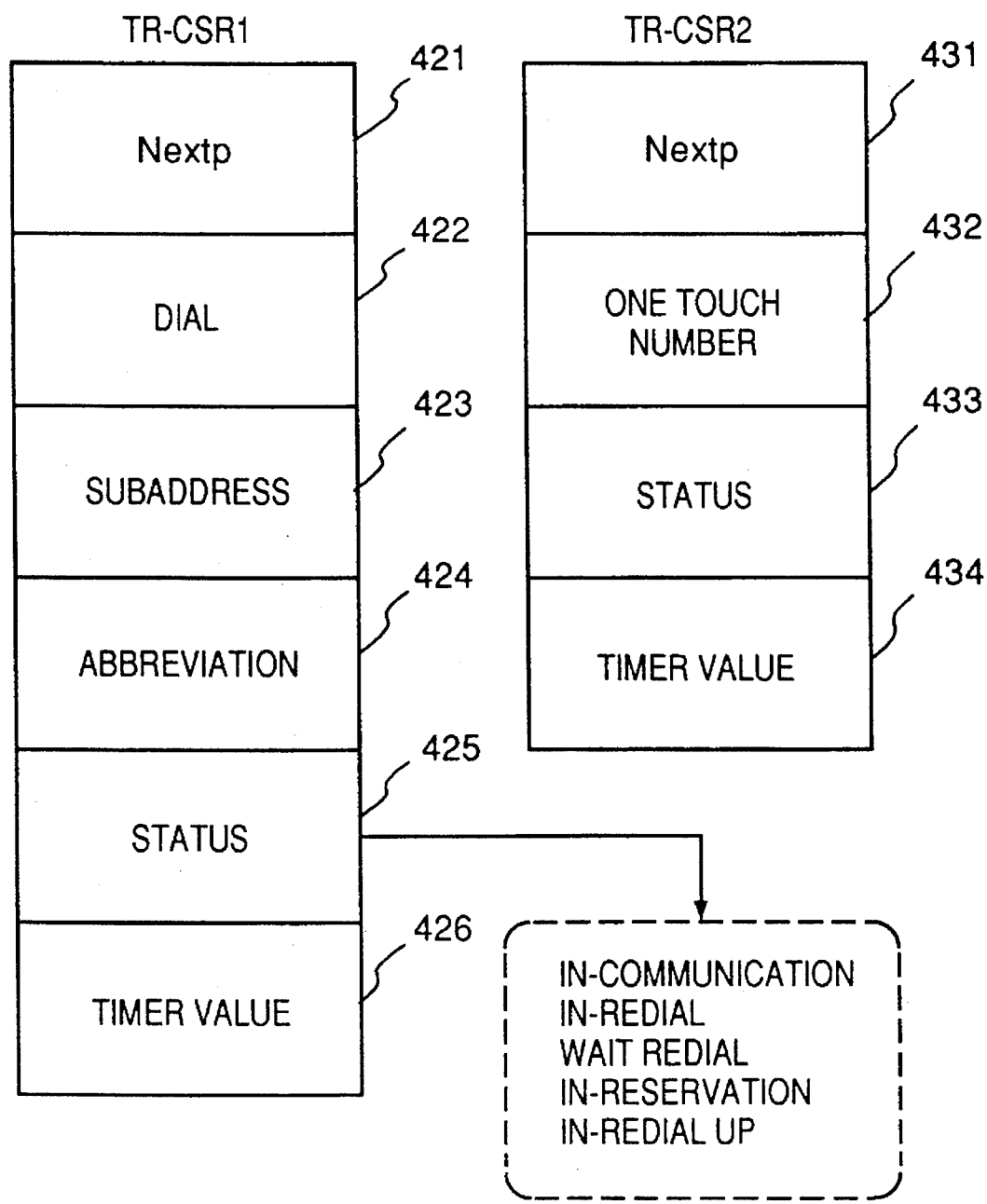

Services 3-3~3-6 in section A shown in FIG. 3 are transactions for use in service management, referred to as TR-SEND in FIG. 4A, and transactions in section B are the transactions for desalination management, referred to as TR-CSR1, TR-CSR2 in FIG. 4B. The transactions in section B before their call out is started are connected to a transmitting destination pointer 413 and, in the case where a plurality of transactions exist in section B for the service 3-4, the next pointer sections 421 and 431 are used to provide connection thereof. A communication with a plurality of transactions in section B is usually referred to as a multi-address calling.

Further, in the case where services themselves are to be linked for example from service 3-3 to service 3-4, the services are managed such that address of the next TR-SEND is written into the next pointer section 411.

A detailed description will now be given with respect to FIG. 4. Referring to FIG. 4, TR-SEND is a transaction of service storing single service information. In this transaction TR-SEND, the next pointer section 411 links and manages TR-SEND, a transmitting document pointer section 412 manages the document to be transmitted, and a transmitting destination pointer section 413 provides link management of the transactions of the destinations indicated by TR-CSR1 and TR-CSR2.

Further, a transmission complete pointer section 414 removes transactions of the destination managed at the transmitting destination pointer section 413 according to the order of their completion of transmission from the transmitting destination pointer section 413 so as to provide link management thereof. A service type pointer section 415 represents a service such as direct transmission, memory transmission or multi-address transmission.

Further, in the transaction TR-CSR1 (FIG. 4B), the next pointer section 421 links the next TR-CSR1, TR-CSR2 destination transaction at the time of multi-address service. A called party dial section 422 stores a value which is directly input as the destination of transmission by means of dialing by the user for example through the 0–9 keys of a ten key.

Further, numeral 423 denotes a sub-address section assigned to each user having a maximum of 19 digits used for example in the ISDN network, and numeral 424 denotes a called party abbreviation section which may be designated by the user. Numeral 424 denotes the abbreviation to be used such as in a communication result report or LCD display during the communication.

Furthermore, numeral 425 denotes the status of communication relating to the destination transaction TR-CSR1. Statuses which may be indicated in 425 include in-communication, in-redial, in-reserve, and in-dial up status.

Here, the in-communication status indicates the fact that connection to a line has been made and transmitting/receiving of data is being executed. The in-reserve status means that, while a transmitting request has been received from the user, it is stacked in the call out cue without any call out for the reason that all the lines are occupied or that the data conversion section is being used. As soon as the resource has become available, a call out is possible.

Further, the in-redial status means that, although a call out has been effected, a monitor timer has been started corresponding to a redial timer set in the system as the called party's terminal is not available for use for example because it is engaged. The in-redial up status means that the time in such a monitor timer for redial is up and a call out is possible as soon as the resource has become available.

Numeral 426 denotes an area for storing a timer value in the redialing process and it is meaningful only when the status of 425 is the in-redial status. If, for example, "10" is input in area 426, the status of redial up will be attained ten seconds later. The status 425 becomes in-redial for example due to the fact that the called party is busy, and the CPU 11 reads redial timer value as the system parameter and sets it to the area 426.

Similarly in TR-CSR2, a pointer section 431 links the next destination transaction and an area 432 stores the number of "one touch" or the number of abbreviated dialing. Further values similar to those in the above 425 and 426 are provided in areas 433 and 434.

The state of the call out cue shown in FIG. 3 represents, from the top, the services of one destination, three destinations, one destination, and two destinations, respectively.

The method for determining the order of call out will now be described.

Figure 9:
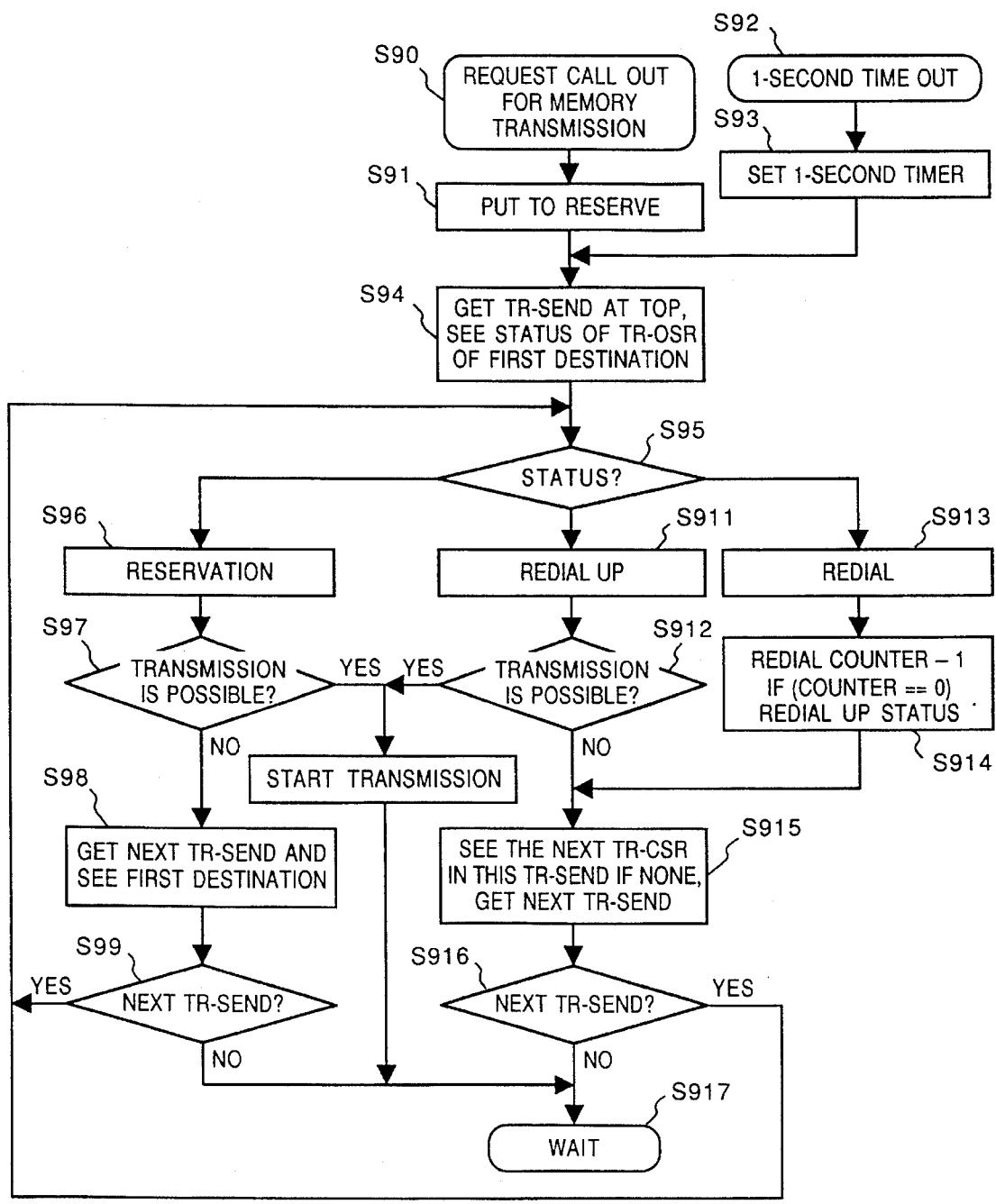
FIG. 9 is a flowchart showing control at the CPU upon occurrence of a memory transmission request and 1-second time up in the above embodiment.

FIG. 9 is a flowchart showing control of the CPU 11 at the time of occurrence of a memory transmission request and 1-second time up.

First, step S90 represents that a memory transmission request has been made by the user through the key input section 14. In step S91, TR-SEND transaction is connected to the last place in the call out cue.

Step S92 represents that time in a 1-second timer for monitoring time up within the call out cue has been up. In step S93, time monitoring of 1-second is requested again to the operation system or a time monitor module which is externally connected thereto. Represented by S94 is a step for extracting the status 425, 433 of the TR-CSR transaction at the top connected to the top transaction of the call out cue. If, for example, the TR-CSR connected to the top of the TR-SEND transaction is TR-CSR1, the status in the above 425 is extracted. If it iS TR-CSR2, the status in the above 433 is extracted.

In step S95, the extracted status is evaluated. Depending on the result of evaluation at step S95, processing proceeds to step S96 if the status is in-reserve, or, if the status is in-redial up, proceeds to step S911. If the status is in-redial, processing proceeds to step S913. In these steps S96, S911, S913, the respective status is confirmed.

In step S97, it is determined whether the current relevant service may be transmitted or not from the status of the data communication section 110, the status of the memory 16 and the state of use of the data conversion section 17, etc. Then, based on the result of determination at the step S97, processing proceeds to step S98 if transmission is not possible or proceeds to step S910 if transmission is possible.

Represented by S98 is a step in which, without looking up the next TR-CSR transaction destination connected to a TR-SEND, the next TR-SEND connected to the call out cue is searched because it was unable to execute the reserved service.

In the present embodiment, in the case of multi-address service, if a first destination is reserved and cannot be called out, a second destination is not called out.

Represented by S99 is a step for determining whether there is a next TR-SEND transaction liked in the call out cue or not. If no link is seen as a result of determination in step S99, processing proceeds to step S917. If there is the next TR-SEND, processing returns to step S95.

In step S910, transmission is started as it is determined that a call out is possible in terms of the resource. Upon starting of the transmission, processing proceeds to step S917 and the CPU 11 waits for the next trigger.

Similarly as step S97, step S912 is the step for determining whether a service in its redial-up status may be transmitted or not. If it is determined that the transmission is possible, processing proceeds to step S910 where transmission as started. If, in step S912, it is determined that transmission is impossible, processing proceeds to step S915.

Represented by S915 is a step for extracting TR-CSR1, 2 connected next to the extracted TR-CSR of the TR-SEND and, if there is no next TR-CSR, the next TR-SEND connected to the call out cue is extracted.

In step S916, it is determined whether the condition of not connected to TR-CSR and not linked with TR-SEND exists or not. If there is TR-SEND or TR-CSR, processing returns to step S95. If neither the next destination nor the next service exists, processing proceeds to step S917. In step S917, the CPU 11 waits for the next trigger.

Represented by S914 is a step for decrementing a redial counter by "1" as determined as in-redial status. For those of which the counter value has become "0" as a result of the decrement, the state is changed to in-redial status and processing then proceeds to step S915.

It should be noted that, though not shown in the figure, if the status of the extracted TR-CSR1, 2 is in-communication status, processing proceeds to step S98 by way of step S96.

Next, FIG. 10 is a flowchart showing operation in the case where a request for direct transmission is made.

In this figure, represented by S101 is a step for determining whether operation for direct transmission has been performed by the user from the key input section 14. In step S102, determination as to whether a call out is possible or not is made in a similar manner as in step S97. Since, however, this is a direct transmission, it is not necessary to check the state of use of the data conversion section 17. If it is determined in step S102 that transmission is possible, processing proceeds to step S103. Further, if it is determined as that transmission is not possible, processing proceeds to step S104.

Represented by S104 is a step for indicating an error stop to the user by means of an LCD display or an error sound. Further, represented by S103 is step for starting communication in accordance with a Group 3 or Group 4 protocol. Next, step S105 represents a step for waiting in a similar manner as in step S917. Represented by S111 is a step for determining whether operation for memory transmission has been effected from the key input section 14. In step S112, other processing is performed. Included in such other processing are processing for detecting a 1-second time out in step S92 and processing for setting a 1-second timer in step S93.

Figure 5:
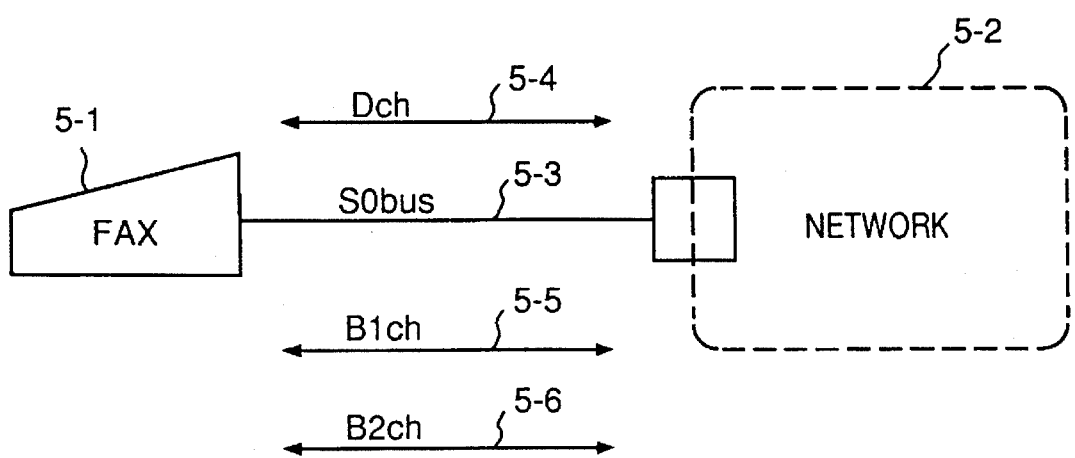
FIG. 5 is a block diagram schematically showing the communication system according to a first embodiment of the present invention.

Communication in ISDN according to a first embodiment of the present invention will now be described with reference to FIG. 5. A facsimile apparatus 5-1 in this first embodiment corresponds only to ISDN lines.

In this figure, the facsimile apparatus 5-1 performs call in/out and facsimile communication. Network 5-2 is a digital network such as ISDN (integrated digital network. A maximum of eight lines may be connected as data lines 5-3 forming a S0 bus which is the window for an ISDN user. Lines 5-4, 5-5, 5-6 are actually within the S0 bus, forming channels through which data flows. The channel 5-4 is D channel for handling setting of a call and release, and the channels 5-5 and 5-6 are B1 channel and B2 channel through which data may be transmitted/received.

A facsimile capable of connected to the S0 bus is able to perform a dual communication through B1 channel and B2 channel, by setting twice a call with terminals of the called party through D channel. If, however, memory transmission is to be actually performed respectively through B1 channel and B2 channel, load on the data conversion section 17 becomes larger as described above and the apparatus itself becomes expensive. Its use, too, is currently limited to a simultaneous communication in which B1 channel or B2 channel is used for a telephone communication and memory transmission is performed through the other empty channel.

Figure 6:
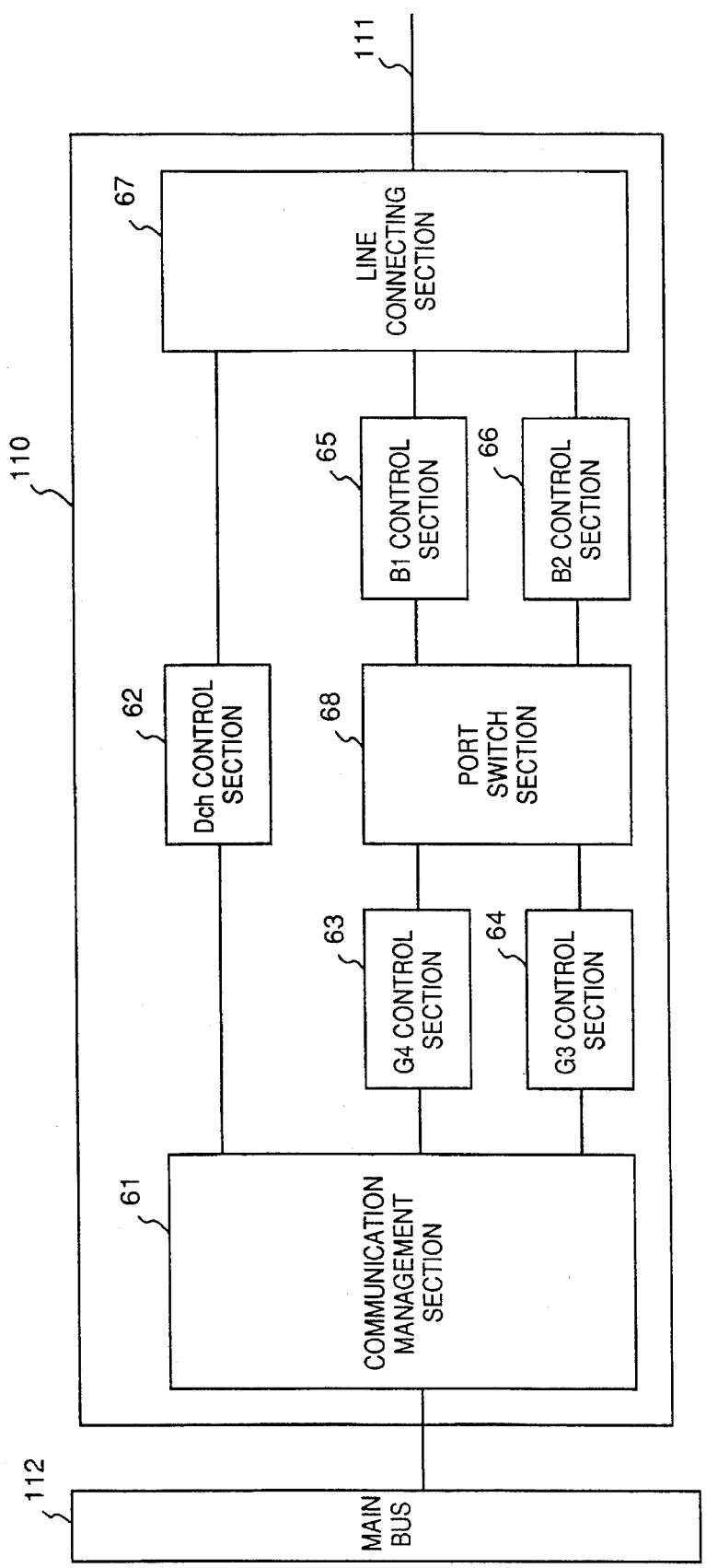
FIG. 6 is a block diagram showing in detail the data communication section in the above first embodiment.

FIG. 6 is a block diagram showing the above data communication section 110 in detail.

In this figure, numeral 111 denotes a multichannel lines such as of line ISDN shown in FIG. 1, and numeral 112 is likewise denotes the system bus shown in FIG. 1.

The data communication section 110 includes: a communication management section 61 for controlling D channel serving as a call control channel and B channel serving as a data transfer channel; D channel control section 62 for manacling call outs and call ins as well as make and break of a call; a G4 control section 63 for implementing Group 4 protocol; a G3 control section for implementing Group 3 protocol; a B1 control section 65 for handling exchange of data concerning B1 channel of the two data channels; a B2 control section 66 for handling exchange of data concerning B2 channel of the same; a line connecting section 67 for delivering received data to D channel and B1/B2 channel, for receiving a data transmitting request from D channel or B1/B2 channel to transmit it onto the line, or for monitoring the state of the lines; and a port switch section 68 through which transmitting request from G4/G3 control section is distributed to B1/B2.

A description will now be given in sequence with respect to a case where, for example, a new G3 direct transmission has occurred while a G4 memory transmission is being executed through B2 channel.

When transmission is directed by the user from the key input section 14, the document data, if a normal memory transmission, is accumulated to the accumulating memory 16 from the data input section 15. Upon completion of such accumulation, the data communication section 110 is started. Here, in the case of a direct transmission, the CPU 11 starts the data communication section 110 and a transmitting request is first made to the communication management section 61.

At the communication management section 61, such as an empty channel in communication is confirmed and operation is effected of transmitting an image by means of Group 3 communication through ISDN to the called party which has been input by the user through a key input. In this case, the communication management section 61 first requires the D channel control section 62 to make a connection to D channel.

D channel control section 62 connects lines in accordance with a D channel protocol of ISDN such as CCITT Recommendations Q.931, Q.921. This protocol is delivered to the line connecting section 67 and is provided onto ISDN.

Further, when a response is received from the line, the D channel protocol data is delivered to the D channel control section 62 from the line connecting section 67. Upon ascertaining connection with the called party's terminal through D channel, D channel control section 62 informs the communication management section 61 of the fact that D channel has been connected.

Communication management section 61 issues a request for connection to the G3 control section 64 so as to start Group 3 communication on B channel. The G3 control section 64 executes a Group 3 protocol such as CCITT Recommendation T.30 with the called party's terminal through the port switch section 68, to ascertain paper size and resolution that may be received by the called party's terminal.

Upon receiving a transmitting request from the G3 control section 64, the port switch section 68 performs transmission to B1 channel which is not currently used. That is, data is delivered to the B1 control section 65.

Upon knowing the capability of the called terminal, the G3 control section 64 informs the CPU 11 of that fact through the communication management section 61. The CPU 11 ANDs receivable resolution at the receiver side with resolution and paper size directed by the user to determine reading resolution and paper size and delivers start of reading to the data input section 15.

Thereby, the document read in at the data input section 15 is once accumulated to the data accumulating memory 16 and is then delivered to the data communication section 110. It should be noted that it is also possible to deliver data to the CPU 11 from the data input section 15 without placing the data accumulating memory 16 therebetween.

The image data delivered to the data communication section 110 is delivered by way of the communication management section 61 to the G3 control section 64, the port switch section 68, B1 control section 65 and a line connecting section 67 and is then sent out onto the ISDN line. After completion of the image data transmission, the G3 control section 64 disconnects the line based on the same T.30 protocol.

In this Group 3 direct transmission, a concurrent operation is performed with a Group 4 memory transmission. For this reason, no conflict occurs at the data conversion section 17 and the G4 control section 63 or the G3 control section 64 is required to support only one communication.

Here, in order to achieve a concurrent operation of communication of Group 4 direct transmission or the like and communication of Group 4 memory transmission or the like, the G4 control section 63 and the G3 control section 64 may internally be provided with two communication capability.

A description will now be given by way of FIG. 7 with respect to ISDN communication in a second embodiment of the present invention based on FIG. 5.

Figure 7:
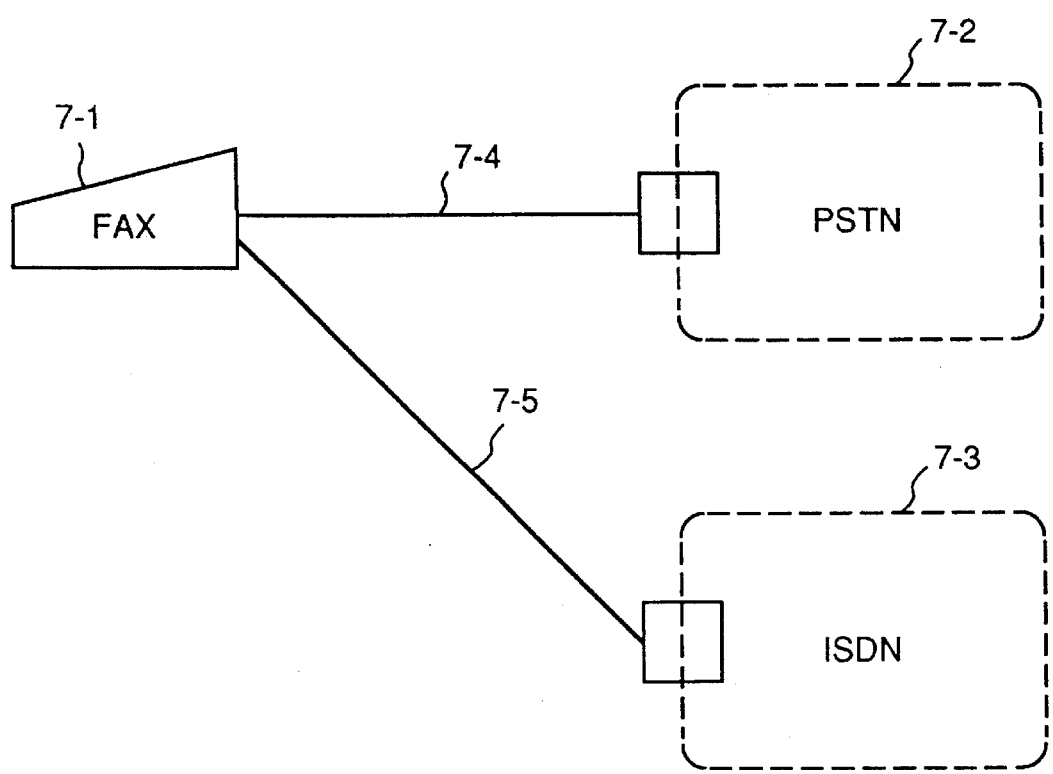
FIG. 7 is a block diagram schematically showing the communication system according to a second embodiment of the present invention.

A facsimile apparatus 7-1 in FIG. 7 accommodates PSTN 7-2 in addition to ISDN 7-3. Numeral 7-4 denotes a wire for connection to the PSTN line and numeral 7-5 denotes a wire for connecting the facsimile to the ISDN line. This wire 7-5 is consist of one D channel and two B channels as described with reference to FIG. 5. For the wire 7-4 of the PSTN line, one corresponding to a B channel in ISDN is provided so that, when the wire 7-4 is occupied by one communication, another call out or call in cannot be effected.

While, for the above first embodiment (FIGS. 5, 6), the communication has been assumed as of using the two B channels in ISDN, the description of the second embodiment will be given with respect to a concurrent communication with a network of different lines.

Figure 8:
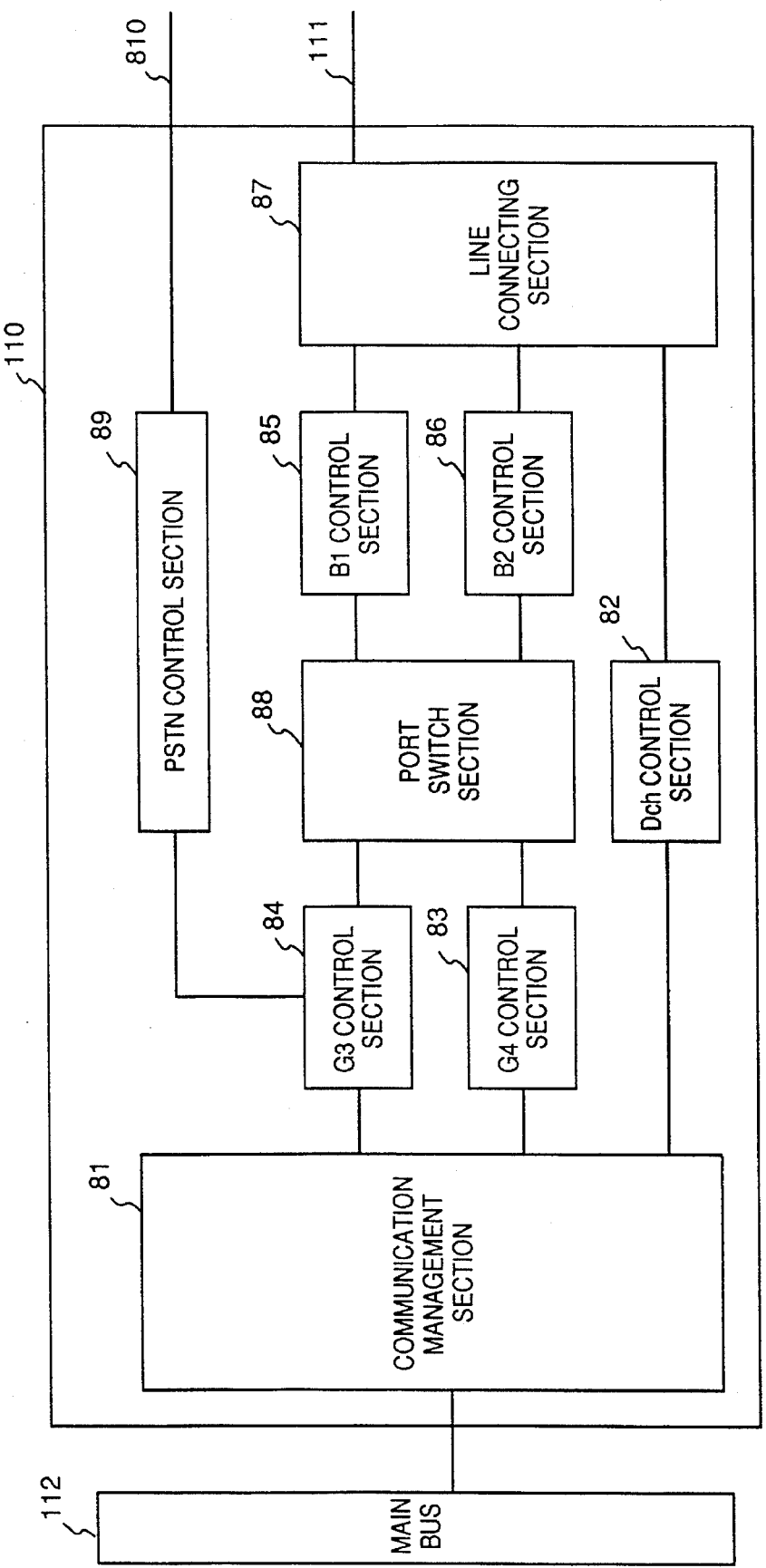
FIG. 8 is a block diagram showing in detail the data communication section in the above second embodiment.

FIG. 8 is a block diagram showing in detail a data communication section 110 in the second embodiment. It should be noted that the components 11~19, 112 other than the data communication section 110 in the present embodiment are common with those in the first embodiment as shown in FIG. 1. In this second embodiment, 2-communication operations solely through ISDN are possible and concurrent 2-communication operations in a combined manner are also possible through ISDN and PSTN. A description will now be given in detail with respect to the operation of the data communication section 110 shown in FIG. 8.

Referring to FIG. 8, numeral 111 denotes a multichannel line such as of a line ISDN as shown in FIG. 1, and numeral 112 likewise denotes a system bus as shown in FIG. 1. The data communication section 110 includes: a communication management section 81 for controlling D channel serving as the call control channel and B channels serving as the data transfer channel; a D channel control section 82 for managing call out and call in and connection/disconnection of a call; a G4 control section 83 for implementing Group 4 protocol; a G3 control section 84 for implementing G3 protocol; a B1 control section 85 for handling exchange of data concerning B1 channel of the two data channels; and a B2 control section 86 for handling exchange of data concerning B2 channel of the same.

Furthermore included are: a line connecting section 87 for delivering received data to D channel and B1/B2 channel, or for receiving a data transmitting request from D channel or B1/B2 channel to send it onto the line, or for monitoring the state of the line; a port switch section 88 for distributing a transmitting request from G4/G3 control section to B1/B2;

a PSTN control section 89 for sending data onto the PSTN line or for delivering data from the PSTN line 810 to the G3 control section 84. It should be noted that the PSTN line 810 is similar to 7-4 in FIG. 7

If, for example, Group 4 memory transmission is directed by the user through the key input section 14 while Group 3 direct receiving is being performed through the PSTN line—since such communication is of memory transmission, the document data is accumulated to the data accumulating memory 16 by the data input section 15 and, upon completion, the data communication section 110 is started.

Firstly, in the data communication section 110, a transmitting request is made to the communication management section 81. The communication management section 81 confirms such as an empty channel of communication and executes an operation for sending an image by means of Group 4 communication through ISDN to the called party which has been input by means of keys by the user. That is, the communication management section 81 first requests to the D channel control section 82 to connect D channel. The D channel control section 82 performs line connecting processing in accordance with D channel protocol of ISDN such as indicated by CCITT Recommendations of Q.931, Q.921. This protocol is delivered to the line connecting section 87 and is sent out onto ISDN.

Further, when a response is received from the line, the D channel protocol data is delivered to D channel control section 82 from the line connecting section 87.

Upon ascertaining that connection with the called party's terminal has been made on D channel, the D channel control section 82 informs the communication management section 81 of the fact that D channel has been connected. The communication management section 81 issues a request for connection to the G4 control section 82 so as to start Group 4 communication on B channel.

The G4 control section 83 executes a Group 4 protocol as indicated by CCITT Recommendation with the called terminal through the port switch section 88, to ascertain paper size and resolution that may be received by the called terminal. The port switch section 88, upon receiving a transmitting request from the G4 control section 83, effects transmission to B1 or B2 channel which is not currently used. That is, data is delivered to the B1 control section 85 or the B2 control section 86.

Upon ascertaining the receiving capability of the called terminal, the G4 control section 83 informs the CPU 11. The CPU 11 determines the optimal paper size for the line based on the receivable resolution at the receiver side and the read document which is directed from the user. When the paper size is determined, the main CPU effects conversion of the image data in the accumulating memory 16 at the data conversion section 17 into an optimal data for the called party.

Then, data is delivered to the data communication section 110 in their order of conversion at the data conversion section 17. The image data delivered to the data communication section 110 is delivered through the management communication section 81 to the G4 control section 83, port switch section 88, B1/B2 control section 85/86 and line connecting section 87 and then is sent to the ISDN line 111.

Then, after the completion of image data transmission, the G4 control section 83 disconnects the line based on the same Group 4 protocol.

It should be noted that the present invention is not limited to a G3/G4 facsimile and may also be applied for example to a Group 4 facsimile without Group 3 facsimile communication function, and various modifications thereof are possible within the scope of the appended claims.

What is claimed is:

1. A data communication apparatus comprising:

input means for inputting data;

memory means for storing data input by said input means as stored data;

data conversion means for converting said stored data into converted data;

transmitting means for transmitting data through a plurality of channels, said transmitting means being operable in a memory transmission mode wherein said converted data is transmitted to a destination, said transmitting means also being operable in another transmission mode wherein data other than said converted data is transmitted to a destination, said transmitting means being operable to transmit data in said memory transmission mode and said other transmission mode in parallel; and control means for discriminating whether said data conversion means is available to convert said stored data or not, and for operating said transmitting means in said memory transmission mode when said data conversion means is available.

2. A data communication apparatus according to claim 1, wherein said other transmission mode is a direct transmission mode wherein said other data is data input from said input means and transmitted to a destination without being stored in said memory means, and wherein said control means operates said transmitting means in said direct transmission mode when said data conversion means is not available to convert said other data upon storage of said other data in said memory means.

3. A data communication apparatus according to claim 2, further comprising means for inputting a request for the direct transmission modes said control means operating said transmitting means in said direct transmission mode in response to said request irrespective of whether said data conversion means is available.

4. A data communication means according to claim 1, further comprising means for inputting a request for the memory transmission mode, wherein when said request is input and said data converting means is not available, said control means reserves said request and operates said transmitting means in the memory transmission mode in accordance with said request when said data conversion means becomes available.

5. A data communication apparatus comprising:

input means for inputting data;

memory means for storing data input by said input means as stored data;

conversion means for converting the stored data to converted data which is suitable for a desired destination;

first transmission means for transmitting the data input by said input means to the desired destination without using said memory means and said conversion means;

second transmission means for transmitting the stored data to the desired destination by using said conversion means; and control means for causing said first transmission means to transmit the input data in response to a first request for direct transmission, for causing said second transmission means to transmit the stored data using said conversion means in response to a second request for memory transmission, and for limiting operation of said second transmission means in accordance with a usage condition of said conversion means.

6. A data communication apparatus according to claim 5, wherein when said conversion means is in use, said control means reserves the second request and causes said second transmission means to transmit the stored data in accordance with the reserved second request when said conversion means becomes available.

7. A data communication apparatus according to claim 5, wherein said first and second transmission means transmit data through a plurality of channels and are operable to transmit data in the direct and memory transmission modes in parallel.

* * * * *

UNITED STATES PATENT AND TRADEMARK OFFICE
CERTIFICATE OF CORRECTION

PATENT NO. : 5,479,403
DATED : December 26, 1995
INVENTOR(S) : KAZUTAKA MATSUEDA Page 1 of 2

It is certified that error appears in the above-indentified patent and that said Letters Patent is hereby corrected as shown below:

COLUMN 1

Line 12, "multichannels" should read --multiple channels--.

COLUMN 3

Line 45, "desalination" should read --destination--.

COLUMN 5

Line 33, "liked" should read --linked--.
Line 46, "as" should read --is--.

COLUMN 6

Line 61, "manacling" should read --managing--.

COLUMN 8

Line 26, "is consist" should read --consists--.

UNITED STATES PATENT AND TRADEMARK OFFICE
CERTIFICATE OF CORRECTION

PATENT NO. : 5,479,403
DATED : December 26, 1995
INVENTOR(S) : KAZUTAKA MATSUEDA It is certified that error appears in the above-indentified patent and that said Letters Patent is hereby corrected as shown below:

COLUMN 10

Line 35, "modes" should read --mode,--.
Line 39, "means" should read --apparatus--.

Signed and Sealed this

Fourteenth Day of May, 1996

Attest:

BRUCE LEHMAN

Attesting Officer   Commissioner of Patents and Trademarks